United States Patent
Schillings

(10) Patent No.: US 7,130,477 B1
(45) Date of Patent: Oct. 31, 2006

(54) METHOD AND SYSTEM FOR REDUCING NOISE IN SIGNAL SYSTEMS

(75) Inventor: Benoit Schillings, Palo Alto, CA (US)

(73) Assignee: Openware Systems Inc., Redwood City, CA (US)

( * ) Notice: Subject to any disclaimer, the term of this patent is extended or adjusted under 35 U.S.C. 154(b) by 716 days.

(21) Appl. No.: 10/338,176

(22) Filed: Jan. 8, 2003

(51) Int. Cl.
*G06K 9/40* (2006.01)

(52) U.S. Cl. ............... 382/254; 382/274; 382/275; 358/3.26; 358/3.27

(58) Field of Classification Search ............... 382/255, 382/274, 275, 278; 358/3.26, 3.27, 463
See application file for complete search history.

(56) References Cited

U.S. PATENT DOCUMENTS

| | | | |
|---|---|---|---|
| 5,276,726 A | * | 1/1994 | Galkin .................... 378/207 |
| 5,574,212 A | * | 11/1996 | Madsen et al. ............ 73/1.82 |
| 5,625,137 A | * | 4/1997 | Madsen et al. ............ 73/1.84 |
| 5,670,719 A | * | 9/1997 | Madsen et al. ............ 73/619 |

* cited by examiner

*Primary Examiner*—Samir A. Ahmed
*Assistant Examiner*—Yosef Kassa
(74) *Attorney, Agent, or Firm*—Jackson & Co., LLP; Kuni Oh

(57) ABSTRACT

A method and system for reducing noise in image and audio signals for processing and output display includes determining noise estimates for a given signal and performing a noise reduction routine for two adjacent data in a signal array. By using a predetermined conversion factor and a permissible delta (deviation) between the two adjacent data, energy may be shifted from the higher valued data to the lower valued data to reduce the noise level without changing the total intensity of the signal array (corresponding to image and/or audio data).

55 Claims, 6 Drawing Sheets

METHOD AND SYSTEM FOR REDUCING NOISE IN SIGNAL SYSTEMS

BACKGROUND OF THE INVENTION

1. Field of the Invention

The present invention relates to a method and system for reducing noise in signal systems. More specifically, the present invention relates to a method and system for reducing noise in information processing systems including audio and graphic image display systems.

2. Description of the Related Art

The recent surge in popularity and low cost for digital photography has advanced signal processing technology such that these devices increasingly provide cleaner sound and clearer picture. Also, increasingly digital images are transmitted among consumers, for example, over the internet using email programs and the like, because they find it more convenient than conventional time consuming film developing processes.

Most digital image processing systems include an image sensor such as a Complementary Metal Oxide Semiconductor (CMOS) or a Charge Coupled Device (CCD) detector. However, in handheld devices such as mobile telephones and personal digital assistants, for example, due to size constraints, the lenses used for the CMOS or CCD cameras have a very limited light collection area. Additionally, although CMOS sensors are preferred over CCD sensors in many applications and devices due to cost considerations, CMOS sensors have a much higher readout noise, thus rendering the overall image noisy.

In operation, a typical image sensor detects light by converting impinging photons into electrons and collecting (integrating) them in sensor pixels. After the integration cycle is completed, the electron charge is converted into a voltage that is supplied to the output terminals of the sensor. Typical sources of noise for a sensor, include sensor noise, which is a component of the readout noise created by both the sensor and the electronics themselves, and photon noise which results from the inherent inaccuracy in the measurement of the captured photons. The total noise is approximately equal to the square root of the sum of the square of the readout noise and the square of the photon noise, as illustrated below by equation (1):

$$\text{Total Noise} = \sim \sqrt{((\text{readout noise})^2 + (\text{photon noise})^2)} \quad (1)$$

where the photon noise may be determined by the square root of the number of photons.

In the case of images, various noise sources combine to give a total readout noise for the system. For example, the charge output from a sensor representing a particular pixel may not always be the same given the same light accumulation. The sensor noise is typically specified in the performance sheets for a sensor as readout noise. There may also be other noise associated with the signal amplification stage and the analog to digital conversion process which may vary widely depending on the quality of the components used and the circuit design. For example, if the total readout noise is 1% of the full signal detected, it will not be possible to measure an image feature with a certainty better than 1 part in 100 regardless of the dynamic range of the sensor or the bit depth of the digitizer.

Similarly, in the case of audio data, there are also various sources of noise that reduce the quality of the signal. Such noises may be caused, for example, by manufacturing characteristics of the signal detector and other system components, background noise, and processes associated with signal processing such as amplification, filtering, and the like.

The noise estimate for a given signal, either audio or image, may be determined based upon the characteristics of a signal detector, such as the sensor in the case of image data. However, sensors and signal detectors typically detect the noise in addition to the actual signal. Thus, it is desirable to reduce the noise in audio and image signals detected by signal processing systems such that the captured signal information may be displayed or heard with improved quality.

SUMMARY OF THE INVENTION

In view of the foregoing, there is provided a method of reducing signal noise in accordance with one embodiment includes the steps of calculating a delta based on a target data value and an adjacent data value, the target and adjacent data values corresponding to a signal, determining a first modified data value based on the delta, modifying the delta to obtain a first modified delta if the first modified data value transcends a first predetermined value, determining a second modified data value based on one of the delta and the first modified delta, modifying one of the delta and the first modified delta to obtain a second modified delta, if the second modified data value transcends a second predetermined value, and recalculating the first and second modified data values based on one of the delta, the first modified delta, and the second modified delta.

In one aspect, the step of calculating the delta may comprise determining a difference value between the target data value and the adjacent data value, and dividing the difference value by a conversion factor, where the conversion factor may be a predetermined value.

Additionally, the method in a further aspect may further include the steps of obtaining the target data value from a target data cell in a signal array, and obtaining the adjacent data value from an adjacent data cell in the signal array, where adjacent data cell is positioned adjacent to the target data cell in the signal array.

In a further aspect, the step of determining the first modified data value may also include comparing the target data value and the adjacent data value to determine a higher data value, and subtracting the delta from the higher data value. Moreover, the first predetermined value may be determined based on an original data value of one of the target data cell and the adjacent data cell and a noise estimate value corresponding to the original data value.

Moreover, the step of modifying the delta to obtain a first modified delta may include determining whether the first modified data value is greater than or equal to the first predetermined value, and calculating the first modified delta based on a difference between the first predetermined value and the first modified data value, if the first modified data value is determined to be less than the first predetermined value. Further, the first predetermined value may be, in one aspect, substantially equal to a difference between an original data value of one of the target data cell and the adjacent data cell and a noise estimate value corresponding to the original data value.

Also, the original data value of one of the target data cell and the adjacent data cell may be the original data value of one of the target data cell and the adjacent data cell having a higher data value. In addition, each of the target data cell and the adjacent data cell may have a corresponding noise estimate value.

In a further embodiment, the method may further include the step of maintaining the delta determined at the step of calculating the delta if the first modified data value is determined to be greater than or equal to the first predetermined value.

In addition, the step of determining the second modified data value in yet another embodiment may include comparing the target data value and the adjacent data value to determine a lower data value, and adding the first modified delta to the lower data value to obtain the second modified data value if the first modified data value is determined to be less than the first predetermined value, and alternatively, adding the delta to the lower data value to obtain the second modified data value if the first modified data value is determined to be greater than or equal to the first predetermined value. The second predetermined value may be determined based on an original data value of one of the target data cell and the adjacent data cell and a noise estimate value corresponding to the original data value.

The step of modifying one of the delta and the first modified delta to obtain a second modified delta may in a further aspect, include determining whether the second modified data value is less than or equal to the second predetermined value, and calculating the second modified delta based on a difference between the second predetermined value and the second modified data value, if the second modified data value is determined to be greater than the second predetermined value. Moreover, the second predetermined value may substantially equal to a sum of an original data value of one of the target data cell and the adjacent data cell and a noise estimate value corresponding to the original data value.

The original data value of one of the target data cell and the adjacent data cell may be the original data value of one of the target data cell and the adjacent data cell having a lower data value, and each of the target data cell and the adjacent data cell include have a corresponding noise estimate value.

In still a further embodiment, the method may also include maintaining the delta determined at the step of calculating the delta, if the first modified data value is determined to be greater than or equal to the first predetermined value, and the second modified data value is determined to be less than or equal to the second predetermined value, and alternatively, maintaining the first modified delta determined at the step of modifying the delta, if the first modified data value is determined to be less than the first predetermined value, and the second modified data value is determined to be less than or equal to the second predetermined value.

The step of recalculating may include the step of subtracting from the first modified data value and adding to the second modified data value, one of the delta, the first modified delta, and the second modified delta, where the delta is subtracted from the first modified data value and added to the second modified data value when the first modified data value is determined to be greater than or equal to the first predetermined value, and the second modified data value is determined to be less than or equal to the second predetermined value, the first modified delta is subtracted from the first modified data value and added to the second modified data value when the first modified data value is determined to be less than the first predetermined value, and the second modified data value is determined to be less than or equal to the second predetermined value, and the second modified delta is subtracted from the first modified data value and added to the second modified data value when the second modified data value is determined to be greater than the second predetermined value.

Additionally, the first predetermined value may be substantially equal to a difference between a first original data value of one of the target data cell and the adjacent data cell and a first noise estimate value corresponding to the first original data value, and the second predetermined value may be based on a sum of a second original data value of one of the target data cell and the adjacent data cell and a second noise estimate value corresponding to the second original data value.

Moreover, the first original data value of one of the target data cell and the adjacent data cell may be an original data value of one of the target data cell and the adjacent data cell having a higher data value, and the second original data value of one of the target data cell and the adjacent data cell may be an original data value of one of the target data cell and the adjacent data cell having a lower data value.

Each of the target data value and the adjacent data value may have a corresponding noise estimate value. Also, the target data value corresponds to a target pixel value and the adjacent data value corresponds to an adjacent pixel value.

The delta, the modified delta, and the second modified delta in a further embodiment may each correspond to an amount of energy in the signal, where the delta, the first modified delta, and the second modified delta may each correspond to an amount of energy that can be removed from one of the target data value and the adjacent data value having a higher value, and added to the other of the adjacent data value and the target data value having a lower value.

An apparatus for reducing signal noise in accordance with another embodiment of the present invention includes a noise reduction section configured to receive a signal, the noise reduction section further configured to calculate a delta based on a target data value and an adjacent data value, the target and adjacent data values corresponding to the signal, determine a first modified data value based on the delta, modify the delta to obtain a first modified delta, if the first modified data value transcends a first predetermined value, determine a second modified data value based on one of the delta and the first modified delta, modify one of the delta and the first modified delta to obtain a second modified delta, if the second modified data value transcends a second predetermined value, and recalculate the first and second modified data values based on one of the delta, the first modified delta, and the second modified delta.

The noise reduction section configured to calculate the delta may further be configured to determine a difference value between the target data value and the adjacent data value, divide the difference value by a conversion factor, where the conversion factor is a predetermined value.

The noise reduction section in a further embodiment may be further configured to obtain the target data value from a target data cell in a signal array, and obtain the adjacent data value from an adjacent data cell in the signal array, where the adjacent data cell is positioned adjacent to the target data cell in the signal array.

The noise reduction section configured to determine the first modified data value in a further embodiment may be configured to compare the target data value and the adjacent data value to determine a higher data value, and subtract the delta from the higher data value.

Moreover, the first predetermined value may be determined based on an original data value of one of the target data cell and the adjacent data cell and a noise estimate value corresponding to the original data value.

The noise reduction section configured to modify the delta to obtain a first modified delta may be, in still another embodiment, configured to determine whether the first modified data value is greater than or equal to the first predetermined value, and calculate the first modified delta based on a difference between the first predetermined value and the first modified data value, if the first modified data value is determined to be less than the first predetermined value, where the first predetermined value may be substantially equal to a difference between an original data value of one of the target data cell and the adjacent data cell and a noise estimate value corresponding to the original data value.

Also, the original data value of one of the target data cell and the adjacent data cell may be the original data value of one of the target data cell and the adjacent data cell having a higher data value. Additionally, each of the target data cell and the adjacent data cell may have a corresponding noise estimate value.

The noise reduction section may also be further configured to maintain the delta determined at the step of calculating the delta if the first modified data value is determined to be greater than or equal to the first predetermined value.

The noise reduction section configured to determine the second modified data value in yet another embodiment is configured to compare the target data value and the adjacent data value to determine a lower data value, and add the first modified delta to the lower data value to obtain the second modified data value if the first modified data value is determined to be less than the first predetermined value, and alternatively, adding the delta to the lower data value to obtain the second modified data value if the first modified data value is determined to be greater than or equal to the first predetermined value.

The second predetermined value may be determined based on an original data value of one of the target data cell and the adjacent data cell and a noise estimate value corresponding to the original data value. The noise reduction section configured to modify one of the delta and the first modified delta to obtain a second modified delta, may be further configured to determine whether the second modified data value is less than or equal to the second predetermined value, and calculate the second modified delta based on a difference between the second predetermined value and the second modified data value, if the second modified data value is determined to be greater than the second predetermined value.

The second predetermined value may be substantially equal to a sum of an original data value of one of the target data cell and the adjacent data cell and a noise estimate value corresponding to the original data value. The original data value of one of the target data cell and the adjacent data cell may be the original data value of one of the target data cell and the adjacent data cell having a lower data value, where each of the target data cell and the adjacent data cell has a corresponding noise estimate value.

In still a further embodiment, the noise reduction section may be configured to maintain the delta determined at the step of calculating the delta, if the first modified data value is determined to be greater than or equal to the first predetermined value, and the second modified data value is determined to be less than or equal to the second predetermined value, and alternatively, maintain the first modified delta determined at the step of modifying the delta, if the first modified data value is determined to be less than the first predetermined value, and the second modified data value is determined to be less than or equal to the second predetermined value.

The noise reduction section configured to recalculate may be further configured to subtract from the first modified data value and adding to the second modified data value, one of the delta, the first modified delta, and the second modified delta. Moreover, the delta may be subtracted from the first modified data value and added to the second modified data value when the first modified data value is determined to be greater than or equal to the first predetermined value, and the second modified data value is determined to be less than or equal to the second predetermined value, the first modified delta may be subtracted from the first modified data value and added to the second modified data value when the first modified data value is determined to be less than the first predetermined value, and the second modified data value is determined to be less than or equal to the second predetermined value, and the second modified delta may be subtracted from the first modified data value and added to the second modified data value when the second modified data value is determined to be greater than the second predetermined value.

The first predetermined value in one embodiment may be substantially equal to a difference between a first original data value of one of the target data cell and the adjacent data cell and a first noise estimate value corresponding to the first original data value, and the second predetermined value may be based on a sum of a second original data value of one of the target data cell and the adjacent data cell and a second noise estimate value corresponding to the second original data value.

The first original data value of one of the target data cell and the adjacent data cell may be an original data value of one of the target data cell and the adjacent data cell having a higher data value, and the second original data value of one of the target data cell and the adjacent data cell may be an original data value of one of the target data cell and the adjacent data cell having a lower data value.

In yet another embodiment, each of the target data value and the adjacent data value may have a corresponding noise estimate value. Also, target data value may correspond to a target pixel value and the adjacent data value may correspond to an adjacent pixel value. Moreover, the delta, the modified delta, and the second modified delta may each correspond to an amount of energy in the signal.

The delta, the first modified delta, and the second modified delta in still a further embodiment may each correspond to an amount of energy that can be removed from one of the target data value and the adjacent data value having a higher value, and added to the other of the adjacent data value and the target data value having a lower value.

A program storage device readable by a machine in accordance with still a further embodiment of the present invention, tangibly embodying a program of instructions executable by the machine to perform a method of reducing signal noise, where the method comprises the steps of calculating a delta based on a target data value and an adjacent data value, the target and adjacent data values corresponding to a signal, determining a first modified data value based on the delta, modifying the delta to obtain a first modified delta if the first modified data value transcends a first predetermined value, determining a second modified data value based on one of the delta and the first modified delta, modifying one of the delta and the first modified delta to obtain a second modified delta, if the second modified data value transcends a second predetermined value, and recalculating the first and second modified data values based on one of the delta, the first modified delta, and the second modified delta.

These and other features and advantages of the present invention will be understood upon consideration of the following detailed description of the invention and the accompanying drawings.

DETAILED DESCRIPTION OF THE INVENTION

Figure 1:
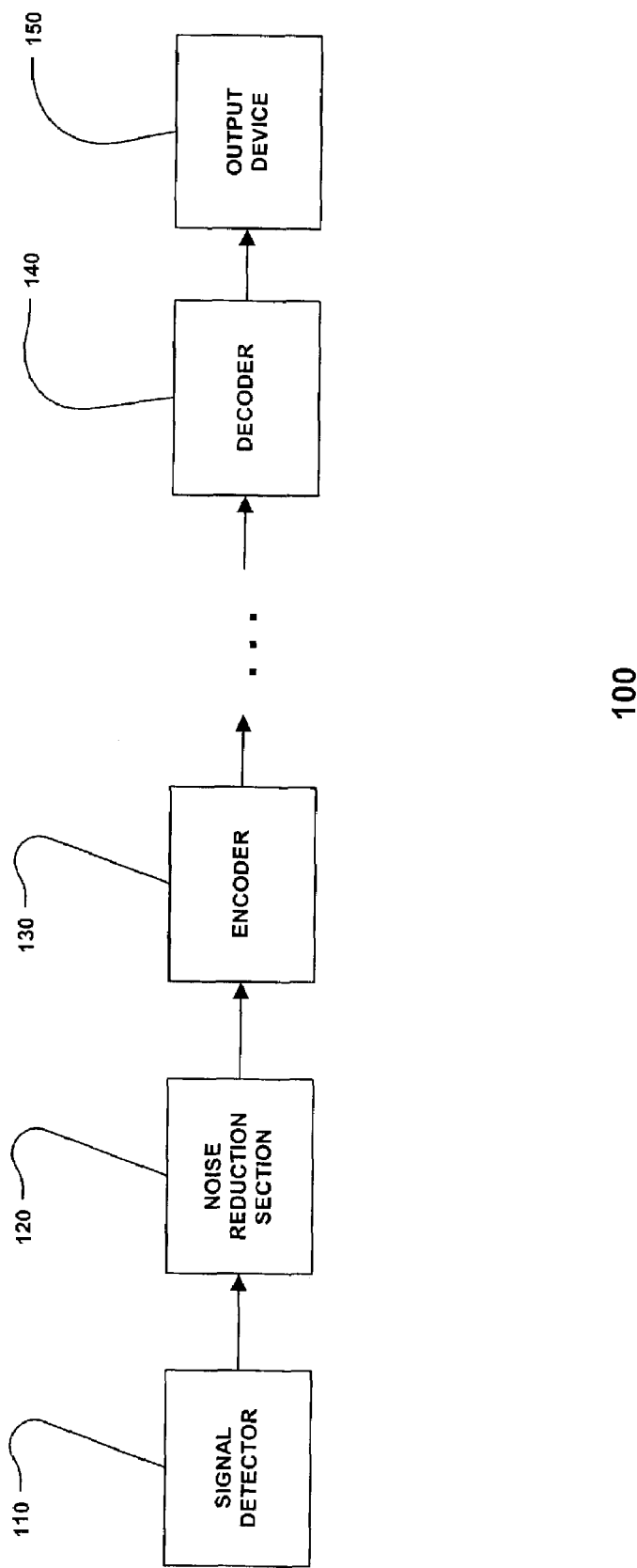
FIG. 1 illustrates a block diagram of the overall signal system in accordance with one embodiment of the present invention.

FIG. 1 illustrates a block diagram of a signal system 100 in accordance with one embodiment of the present invention. The signal system 100 includes a signal detector 110 operatively coupled to a noise reduction section 120. The signal detector 110 in one embodiment includes an image processing device, such as a digital camera or an integrated image and audio processing device, which is configured to capture signals for processing. It will be appreciated that the signal may be image data, text data, audio data or a combination of two or more of such data. The noise reduction section 120, as discussed in further detail below, is configured to perform noise reduction processing on the captured signal in accordance with the various embodiments of the present invention.

Referring to FIG. 1, the signal system 100 further includes an encoder 130 operatively coupled to the noise reduction section 120. In one embodiment, the encoder 130 may be configured to perform processings on the captured signal, such as signal compression. In the case of images, the encoder 130 may include a JPEG (Joint Photographic Experts Group) encoder. As can also be seen from the Figure, the signal system 100 further includes a decoder 140, such as for example, a JPEG decoder, which is configured to decode the encoded signal from the encoder 130. The decoded signal is then output to an output device 150 such as a display.

The output device 150 may include, for example, a liquid crystal display (LCD), a plasma display and the like configured to display digital images, and or a speaker for outputting audio signals. It should be noted that the encoded signal from the encoder 130 may undergo further signal processing such as filtering (not shown), for example, before being decoded/decompressed by decoder 140. In one embodiment of the present invention, the processed signal includes noise reduced image information for display on output device 150. As discussed in further detail below, in accordance with the various embodiments of the present invention, the noise reduction section 120 is configured to perform one or more processes upon the captured signal to reduce the noise level of the signal.

More specifically, in the case of still images, a noise reduction process in accordance with various embodiments of the present invention reduces the signal noise of the image by reducing the difference in energy levels of adjacent pixels in a pixel array which stores the pixel data corresponding to the still image. Accordingly, while the overall energy level of the entire pixel array corresponding to the still image is maintained, energy may be added to and subtracted from individual pixels within the pixel array to smooth out the transition in energy levels between adjacent pixels. Thus, each pixel value of the image may be modified, but the overall energy level of the image remains unchanged.

In one embodiment, the energy level of a modified pixel is constrained by the original energy level of the pixel and its a corresponding noise estimate value, as well as by the energy levels of the adjacent pixels. As explained in further detail below, the energy level of the pixels in the pixel array may be modified based on a predetermined conversion factor and the internal specifications of the signal detector 110 (FIG. 1), such as the CCD sensor in the case of image data.

It will be appreciated by one of ordinary skill in the art that the various embodiments as described in detail herein, while discussed in relation to image data, are equally applicable to audio data. In the case of audio data, the noise reduction process reduces the difference in energy levels of adjacent data cells in an audio signal array which stores the audio data corresponding to the audio signal. In particular, energy may be added to and subtracted from individual data cells within the audio signal array, but the overall energy level of the audio signal array is maintained. However, as is the case for image data, the energy level of a modified audio data cell is constrained by its original energy level and its corresponding noise estimate value, as well as by the energy level of the adjacent audio data cells.

In one embodiment of the present invention, the signal system 100 includes an original data array having a plurality of data cells each of which stores an original data value of a captured signal. The signal system 100 also includes a noise estimate array having a plurality of data cells, each of which stores a noise estimate value corresponding to an original data value. The signal system 100 further includes a modified data array having a plurality of data cells each of which stores a modified value obtained from the noise reduction process. Each data cell in the modified array corresponds to a respective data cell in the original data array. In one embodiment the original data array, the noise estimate array, and the modified data array, are stored in a memory (not shown) of the signal system 100. Examples of these three arrays are discussed more fully below in conjunction with FIGS. 2A–2C (for image data) and FIGS. 6A–6C (for audio data).

Figure 2B:
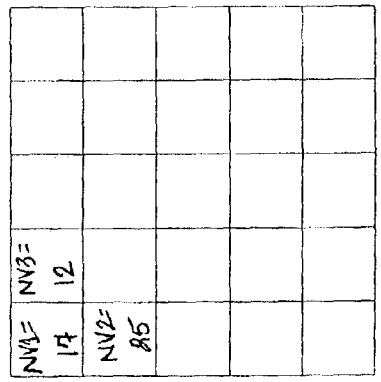
FIGS. 2A–2C illustrate a series of image arrays used in the noise reduction process in accordance with one embodiment of the present invention.
Figure 2A:
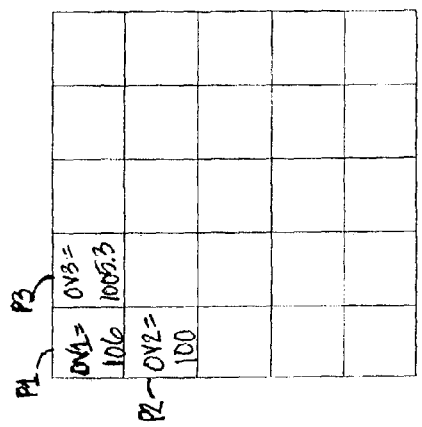
Figure 2C:
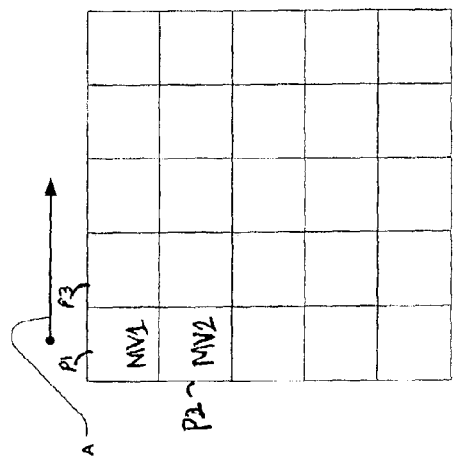

FIGS. 2A–2C illustrate a series of image arrays used in the noise reduction process in accordance with one embodiment of the present invention. It should be noted here that FIGS. 2A–2C are discussed in further detail in conjunction with the processes and routines illustrated in FIGS. 3–5 below. More specifically, FIG. 2A illustrates an original pixel array for a portion of image data captured by the signal detector 110 (FIG. 1). Each pixel in the pixel array has a corresponding original pixel value OVx. For example, the pixel at position P1 has an original pixel value OV1 of 106.

FIG. 2B illustrates a noise estimate array of noise estimate values, each of which corresponds to a respective original pixel value OVx of the pixel array shown in FIG. 2A. For example, the original pixel value OV1 of 106 for the pixel at position P1 has a corresponding noise estimate value NV1 of 17. In one embodiment of the present invention, the noise estimate values are predetermined values based on the design specification of the signal detector 110 (FIG. 1), and may be stored in a memory (not shown) for access, prior to performing the noise reduction process. Alternatively, the noise estimate values may be calculated based on, for example, the characteristics of the signal detector 110 (FIG. 1) before the noise reduction routine is performed.

FIG. 2C illustrates a modified pixel array of modified pixel values MVx obtained from the noise reduction process. Each pixel in the modified pixel array corresponds to a respective pixel in the original pixel array illustrated in FIG. 2A. That is, the original pixel array (FIG. 2A) represents the original pixel value OVx of a pixel at a particular position Px, while the modified pixel array (FIG. 2C) represents the modified pixel value MVx of a pixel at the same position Px. The modified pixel values MVx are determined by performing the noise reduction process upon the corresponding original pixel values OVx in accordance with the one embodiment of the present invention.

For example, as shown in FIGS. 2A and 2C, the pixel at position P1 has an original pixel value OV1 of 106 and a modified pixel value of MV1 as seen in the original pixel array and the modified pixel array, respectively. As discussed in further detail below, during the noise reduction process, the modified pixel values MVx are initially set to the original pixel values OVx for each respective corresponding pixel in the pixel array. Then, as a result of the noise reduction process discussed in further detail below the modified pixel values MVx may change.

Figure 3:
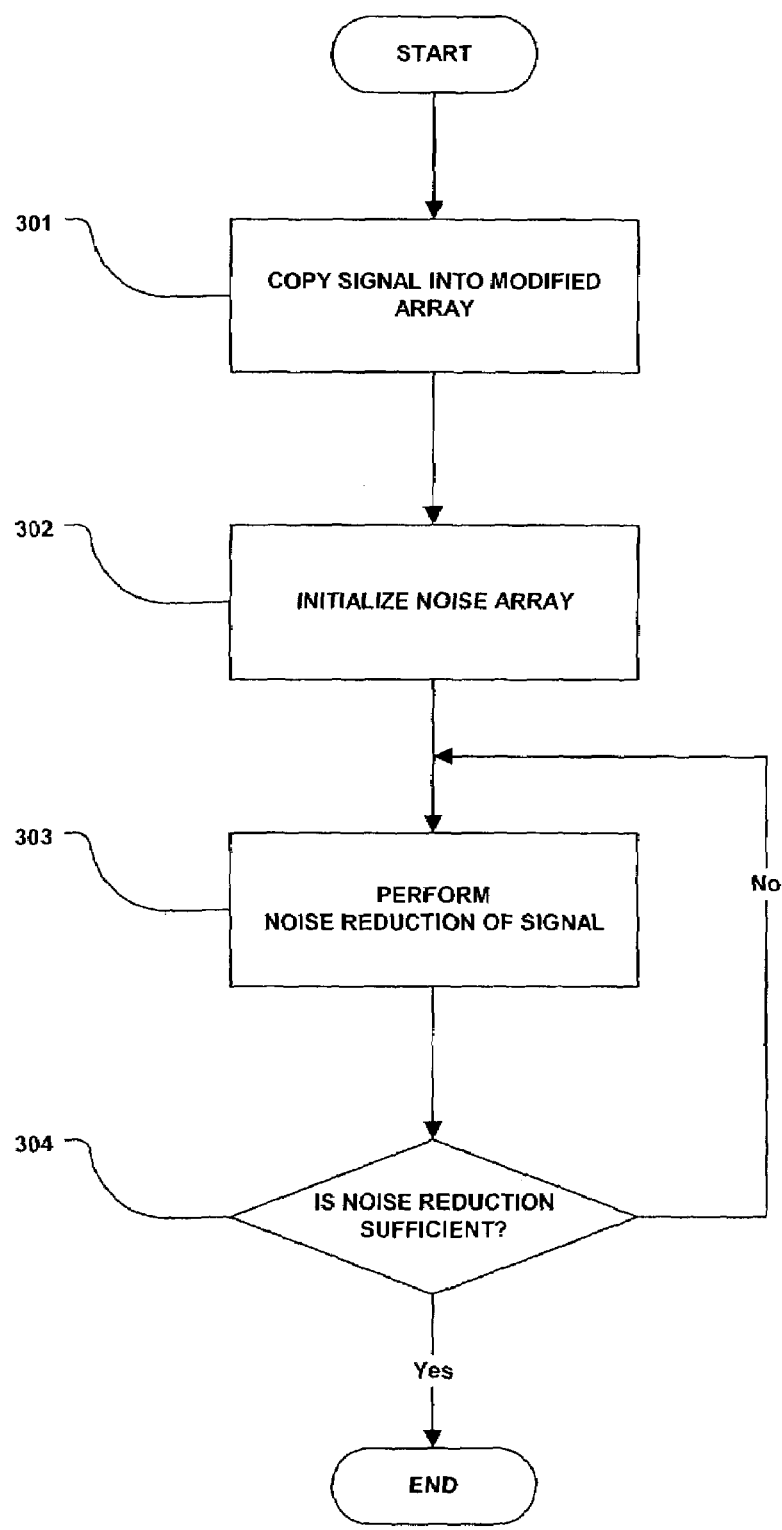
FIG. 3 is a flowchart illustrating the overall noise reduction process in accordance with one embodiment of the present invention.

FIG. 3 is a flowchart for illustrating the noise reduction process in accordance with one embodiment of the present invention. For clarification purposes, this flowchart will be discussed in conjunction with the representative example of one embodiment illustrated in FIGS. 2A–2C. Referring now to step 301, original signal values of the signal captured by signal detector 110 (FIG. 1) are copied to a modified data array. For example, the original pixel values OVx illustrated in the pixel array of FIG. 2A of the image captured by signal detector 110 (FIG. 1) are copied to the modified pixel array illustrated in FIG. 2C. Thereafter at step 302, a noise estimate array is initialized. In particular, a noise estimate array corresponding to the original data array representing the captured signal is initialized. For example, in the case of images, a noise estimate value is determined for each corresponding pixel value in the original pixel array (FIG. 2A) and stored in the noise estimate array illustrated in FIG. 2B. Thus, a corresponding noise estimate array (FIG. 2B) is determined for the original pixel array (FIG. 2A). As indicated above, the noise estimate values may be based on predetermined design specifications and/or characteristics of the signal sensor 110 (FIG. 1).

Referring back to FIG. 3, after initializing the noise estimate array at step 302, a noise reduction routine is initiated at step 303 to perform the noise reduction process on the signal data. For example, as in the case of images, as discussed in further detail below in conjunction with FIG. 4, each pixel value in the modified pixel array (FIG. 2C) at step 301 is compared with its respective adjacent pixel values. Then, based on the comparison and the corresponding noise estimate values retrieved from the noise estimate array (FIG. 2B), the pixel values are modified to reduce the transition of energy levels between the adjacent pixels.

Referring again to FIG. 3, after reducing the noise in the noise reduction process at step 303, it is determined whether the noise reduction is sufficient at step 304. This determination may be based upon, for example, whether the noise reduction level has reached a predetermined level, whether a predetermined number of iterations of the noise reduction routine have occurred, and/or whether a predetermined amount of time has elapsed. The determination at step 304 may also be based on the level of energy migration between adjacent data cells, such that when the difference between adjacent data values reaches a predetermined level, such as, one percent, it may be determined in one embodiment that the noise reduction routine has reached an acceptable level. There may be other basis for the determination in step 304. Those discussed herein are exemplary and are not intended to limit the scope of the present invention.

Referring again to step 304, if it is determined that the noise reduction is not sufficient, the process returns to step 303 to perform the noise reduction routine again. However, if the noise reduction is determined to be sufficient at step 304, then the process terminates. Upon completing the noise reduction routine to a satisfactory level, other processes may be performed on the noise reduced signal data, such as encoding, decoding, and filtering as discussed above in conjunction with FIG. 1. In this manner, in one embodiment of the present invention, the noise reduction routine is performed on each data cell of the modified data array corresponding to a portion of the captured signal in an iterative manner until satisfactory noise reduction is achieved.

In particular, the noise reduction routine begins by selecting a target data cell from the modified data array. To reduce the noise associated with the data value in the target data cell, energy is shifted among the adjacent data cells to minimize the difference in data values amongst them. Specifically, an amount of energy, herein referred to as DELTA for convenience, is removed from the data cell having a higher value and added to the adjacent data cell having a lower value. However, there are limits to the amount of energy that can be shifted from one data cell to another. In particular, an upper limit is that the data cell to which energy is added cannot have a value that exceeds the sum of its original data value and its corresponding noise estimate value. Moreover, a lower limit is that the data cell from which energy is removed cannot have a value that is less than the difference between its original data value and its corresponding noise estimate value. Also factored into the determination of the value of DELTA may be the conversion factor discussed above to ensure a smooth energy migration between the adjacent data cells by avoiding abrupt transitions.

As discussed in further detail below, the DELTA is first determined based on a difference between the data values of the target data cell and the adjacent data cell. If the new modified data values of the target and adjacent data cells based on DELTA as first determined fall within the upper and lower limits, then an amount of energy equal to DELTA can be shifted between the adjacent data cells. However, if either of the new modified data values transcends the upper or lower limits, then DELTA is modified to enable the new modified data values to be within the permissible range. In this manner, energy shifts between adjacent data cells appear gradual rather than abrupt. The noise reduction routine is explained more fully in conjunction with the flowchart of FIG. 4 illustrating the noise reduction routine of step 303 of FIG. 3, in accordance with one embodiment of the present invention.

Figure 4:
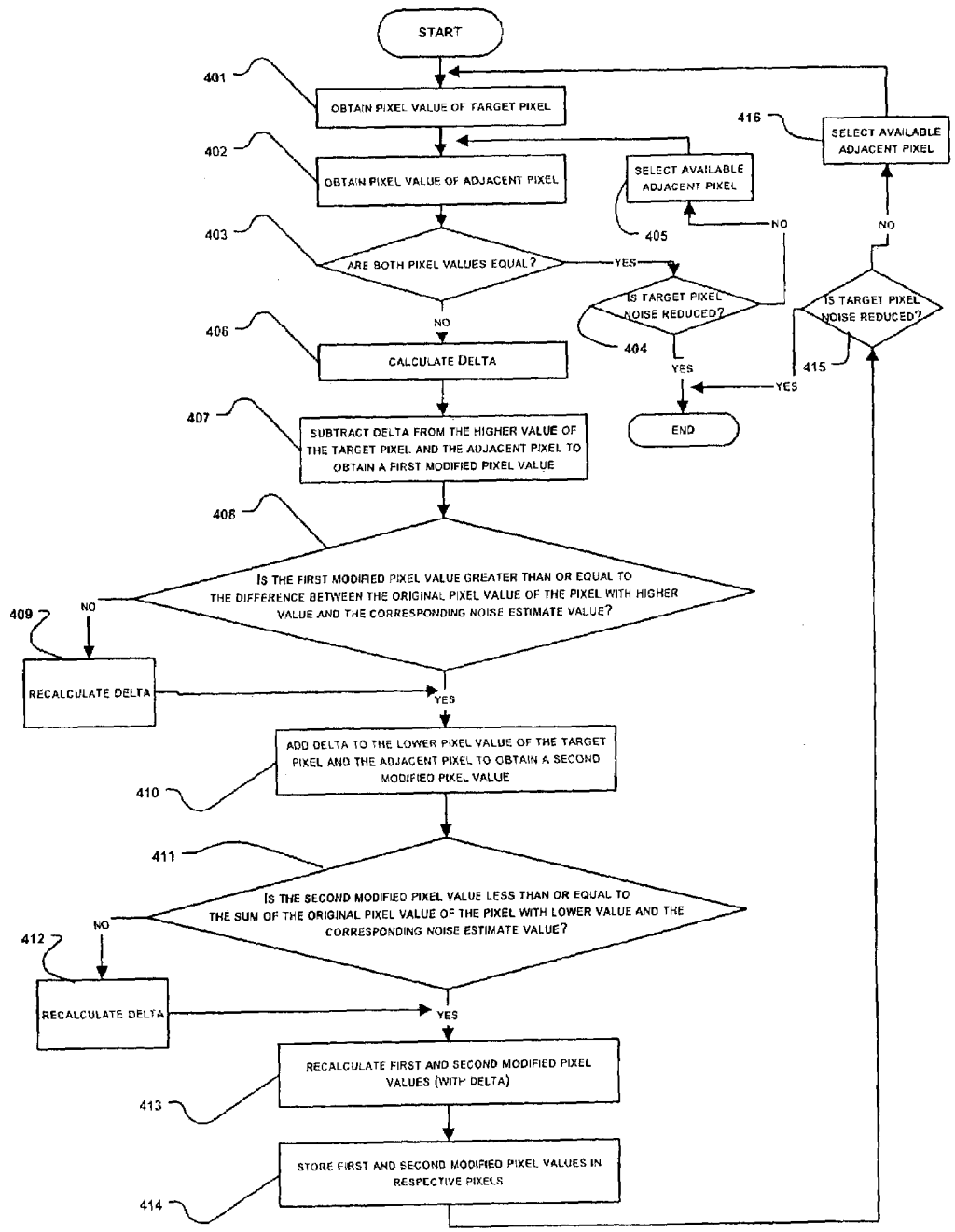
FIG. 4 is a flowchart illustrating the noise reduction routine of FIG. 3 in accordance with one embodiment of the present invention.

FIG. 4 is a flowchart illustrating the noise reduction routine of step 303 of FIG. 3 in accordance with one embodiment of the present invention. For exemplary purposes FIG. 4 is illustrated in conjunction with an image signal, however, it will be appreciated by one of ordinary skill in the art that FIG. 4 also may be applied to an audio signal. For simplification purposes, data cell and data value are referred to in the discussion and flowchart of FIG. 4 as pixel and pixel value. The terms pixel and pixel value are used for exemplary purposes only to simplify the explanation of the noise reduction process in conjunction with an image signal. The use of such terms is not intended to limit the scope of the invention.

Referring to FIG. 4, at step 401 a target pixel at a particular position P in the modified pixel array (FIG. 2C) is selected for the first iteration of the noise reduction routine, and its corresponding pixel value TV is obtained. At step 402, a pixel adjacent to the pixel at the position P in the modified pixel array (FIG. 2C) selected at step 401, is selected and its corresponding pixel value AV is obtained.

In one embodiment of the present invention, the noise reduction routine is performed in a given direction of the modified pixel array (FIG. 2C). For example, the first iteration of the noise reduction routine may proceed from left to right in the modified pixel array, as illustrated by arrow A in FIG. 2C. In this case, referring to FIG. 2C, if the pixel at position P1 is selected as the target pixel, then the adjacent pixels are at positions P2 and P3. If the pixel at position P2 is selected for the first iteration of the noise reduction routine, then the pixel at position P3 would be the adjacent pixel for the second iteration. It will be appreciated that the pixel at position P3 may be selected for the first iteration and the pixel at position P2 for the second iteration.

In an alternate embodiment of the present invention, pixels in the modified pixel array may be randomly selected for performing the noise reduction routine. In this case, a pixel is selected at random for the first iteration of the noise reduction routine. Then, each adjacent pixel is selected for a respective subsequent iteration of the noise reduction routine. Once the randomly selected pixel has undergone the noise reduction routine with the adjacent pixels, another pixel in the modified pixel array may be randomly selected to undergo the noise reduction routine if it is determined at step 304 of FIG. 3 that the noise reduction is not sufficient. However, it should be noted that selecting pixels randomly to perform the noise reduction routine, although effective, may be less efficient than selecting pixels in a given direction.

Referring back to FIG. 4, at step 403 it is determined whether the pixel values of both the target pixel and the adjacent pixel are equal. If these pixel values are equal, there is no energy that can be shifted between these pixels (e.g., there is no energy transition between the adjacent pixels). Thus, the target pixel value needs to be compared with another adjacent pixel value. To do so, the routine proceeds to step 404, where it is determined whether the target pixel has been noise reduced. Specifically, at this step it is determined whether there is another pixel adjacent to the target pixel in the given direction to which the target pixel has not been compared. If there is another such adjacent pixel, then it is selected at step 405, and the noise reduction routine returns to step 402 to obtain the pixel value of this adjacent pixel. On the other hand, if there is no other available adjacent pixel, then the noise reduction routine ends and the process returns to step 304 of FIG. 3 where it is determined whether the noise reduction is sufficient.

Referring again to FIG. 4, if it is determined at step 403 that the pixel values of both the target pixel and the adjacent pixel are not equal, then the noise reduction routine proceeds to step 406 where the DELTA is calculated. As indicated above, the DELTA value reflects the amount of energy that may be shifted between the two adjacent pixels. In one embodiment of the present invention, the DELTA value is determined to be the difference between the two adjacent pixel values divided by a predetermined conversion factor K (also referred to as a relaxation factor). In one embodiment, the conversion factor K governs the rate of energy migration between the adjacent pixels.

After determining the value of the DELTA at step 406, the DELTA is subtracted at step 407 from the higher value of the target pixel and the adjacent pixel to obtain a first modified pixel value. More specifically, at step 407, it is determined which of the two energy equivalent to the DELTA to obtain a first modified pixel value. As discussed in further detail below, the energy taken away from the pixel having the higher pixel value is added to the pixel having the lower value. For example, if the target pixel has a higher pixel value, then an amount of energy equivalent to the DELTA is removed from the target pixel value to obtain the first modified pixel value. Then, later in the noise reduction routine the DELTA amount of energy is added to the adjacent pixel value.

Referring again to FIG. 4, at step 408 it is determined whether the first modified pixel value is greater than or equal to the difference between the original pixel value of the pixel with the higher value and the corresponding noise estimate value. As indicated above, there is both an upper and a lower limit on the amount of energy that can be shifted among the pixels within the pixel array (that is, there is a limit on the DELTA). Step 408 ensures that the amount of energy shifted does not decrease the value of the higher valued pixel so as to transcend (i.e., go below) the lower limit. Since it has already been determined at step 407 which of the two adjacent pixel values is higher, the original pixel value of the pixel determined to have the higher value is obtained from step 301 of FIG. 3. Similarly, the noise estimate value corresponding to the original pixel value can be obtained from the noise estimate array illustrated in FIG. 2B. Then, the difference between the original pixel value and the noise estimate value is calculated. This establishes the lower limit of the first modified pixel value. This lower limit is then compared with the first modified pixel value obtained at step 407.

Referring yet again to FIG. 4, if at step 408 it is determined that the first modified pixel value obtained at step 407 is greater than or equal to the lower limit, then the noise reduction routine proceeds to step 410. However, if it is determined at step 408 that the first modified pixel value obtained at step 407 is less than the lower limit, then the routine proceeds to step 409 where DELTA is recalculated to obtain a first modified DELTA. The DELTA is recalculated at step 409 since the first modified pixel value obtained at step 407 is below the lower limit. In particular, the amount of energy (i.e., DELTA) being removed from the pixel having the higher pixel value is beyond the permissible range. In one embodiment, DELTA is recalculated to equal the difference between the first modified pixel value obtained at step 407 and the lower limit.

At step 410, the DELTA is added to the lower value of the target pixel and the adjacent pixel to obtain a second modified pixel value. Since DELTA already has been taken away from the pixel having the higher value, it is now being added to the other pixel having the lower value. The DELTA used to obtain the second modified pixel value depends upon whether the first modified pixel value obtained at step 407 was above the lower limit. If the first modified pixel value obtained at step 407 was above the lower limit, then the DELTA calculated at step 406 is used to obtain the second modified pixel value. However, if the first modified pixel value obtained at step 407 is below the lower limit, then the DELTA recalculated at step 409 (i.e., the first modified DELTA) is used to obtain the second modified pixel value.

Thereafter at step 411, it is determined whether the second modified pixel value is less than or equal to the sum of the original pixel value of the pixel with the lower value and the corresponding noise estimate value. This step ensures that the amount of energy shifted does not increase the value of the lower valued pixel so as to transcend (i.e., go above) an upper limit. Since it has already been determined at step 407 which of the two adjacent pixel values is higher, the original pixel value of the pixel determined to have the lower value can be obtained from step 301 of FIG. 3. Similarly, the noise estimate value corresponding to the original pixel value may be obtained from the noise estimate array as shown by step 302 of FIG. 3. The sum of the original pixel value and the noise estimate value is then calculated establishing the upper limit of the second modified pixel value. This upper limit is then compared with the second modified pixel value obtained at step 410. If it is determined that the second modified pixel value obtained at step 410 is less than or equal to the upper limit, then the routine proceeds to step 413. However, if it is determined that the second modified pixel value obtained at step 410 is greater than the upper limit, then the routine proceeds to step 412 where the DELTA is recalculated again to obtain a second modified DELTA.

More specifically, the DELTA is recalculated again at step 412 since the second modified pixel value obtained at step 410 is above the upper limit. That is, the amount of energy (i.e., DELTA) added to the pixel having the lower pixel value is beyond the permissible range. In one embodiment, the second modified DELTA equals the difference between the second modified pixel value obtained at step 410, and the upper limit. The routine then proceeds to step 413.

At step 413, the first and second modified pixel values are recalculated. Specifically, the first modified pixel value is obtained by subtracting the DELTA from the higher value of the target pixel and the adjacent pixel. The second modified pixel value is obtained by adding the DELTA to the lower value of the target pixel and the adjacent pixel. The DELTA used to obtain the recalculated first and second modified pixel values depends on whether the first modified pixel value obtained at step 407 is above the lower limit and whether the second modified pixel value obtained at step 410 is below the upper limit. If the first modified pixel value obtained at step 407 is above the lower limit and the second modified pixel value obtained at step 410 is below the upper limit, that is, if both the first and the second modified pixel values respectively determined at steps 407 and 410, fall within the permissible range set by the upper and lower limits, then the DELTA calculated at step 406 is used to obtain the first and second modified pixel values.

On the other hand, if the first modified pixel value obtained at step 407 is below the lower limit (i.e., beyond the permissible range set by the lower limit) and if the second modified pixel value obtained at step 410 is below the upper limit, then the first modified DELTA calculated at step 409 is used to obtain the first and second modified pixel values.

Alternatively, if the second modified pixel value obtained at step 410 is above the upper limit (i.e., beyond the permissible range set by the upper limit), then the second modified DELTA calculated at step 412 is used to obtain the first and second modified pixel values.

Referring still again to FIG. 4, at step 414, the first and second modified pixel values recalculated at step 413 are stored in the respective target and adjacent pixels. In particular, if the target pixel was determined to have the higher value, then the first modified pixel value is stored in the target pixel and the second modified pixel value is stored in the adjacent pixel. Alternatively, if the adjacent pixel was determined to have the higher value, then the first modified pixel value is stored in the adjacent pixel and the second modified pixel value is stored in the target pixel. The routine then proceeds to step 415 where it is determined whether the target pixel has been noise reduced. This step is similar to step 404. If the target pixel has been noise reduced, the noise reduction routine ends and the process returns to step 304 of FIG. 3. If the target pixel has not been noise reduced, the noise reduction routine proceeds to step 416 where another available adjacent pixel is selected. The routine then returns to step 401.

In this manner, the noise reduction routine is applied in an iterative manner to each adjacent pixel of the modified pixel array until the image noise is sufficiently reduced. Moreover, the modified value of the pixel from the previous iteration is used to determine the noise reduction level for each subsequent pixel in a given direction of the modified pixel array.

Figure 5:
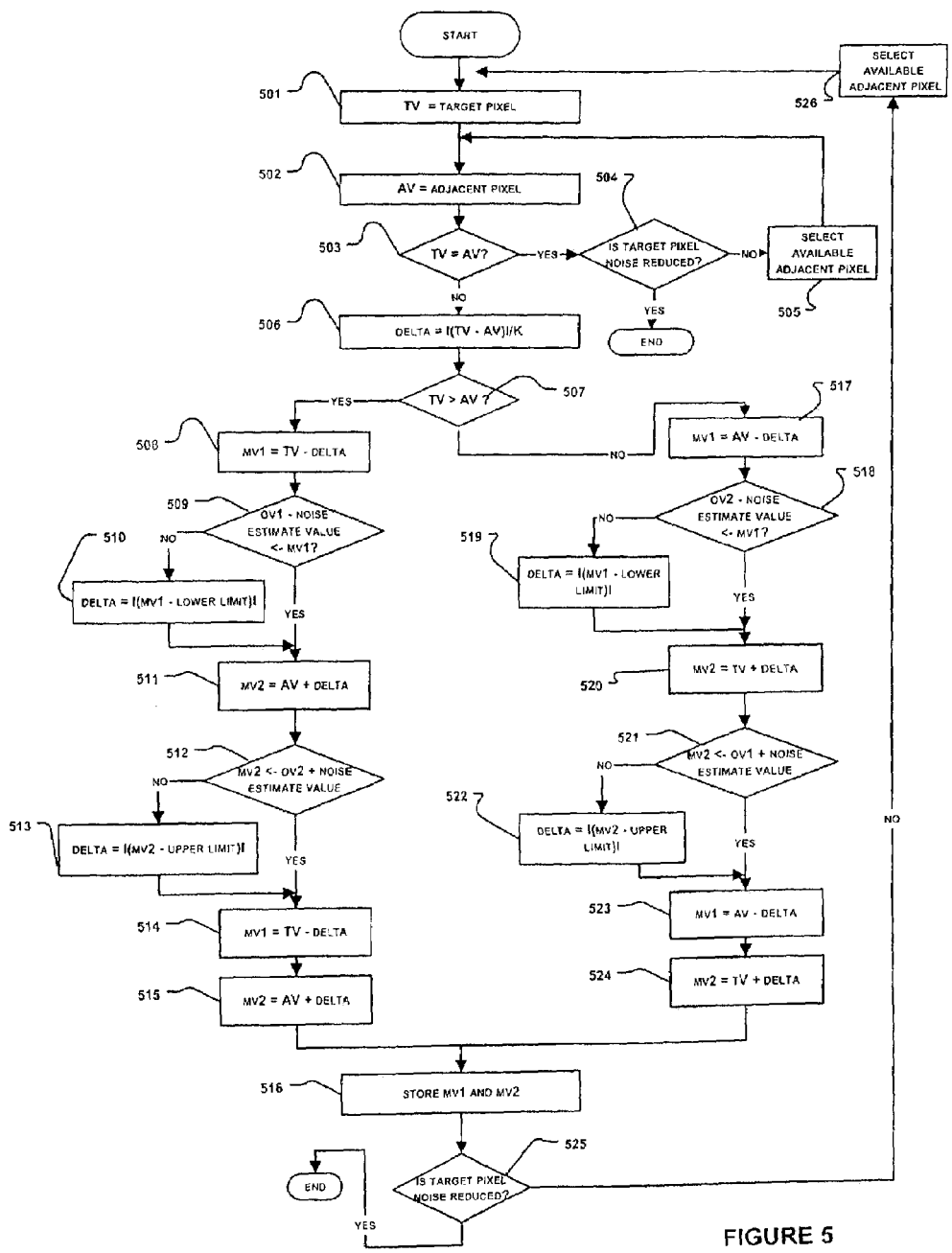
FIG. 5 is a flowchart illustration the noise reduction routine of FIG. 3 in accordance with another embodiment of the present invention.

FIG. 5 is a flowchart illustrating an exemplary noise reduction routine of FIG. 3 for images in accordance with another embodiment of the present invention. For illustration purposes, this flowchart will be discussed in conjunction with the representative example of the present invention illustrated in FIGS. 2A–2C.

Referring to FIG. 5, at step 501 a pixel at position P1 in the modified pixel array (FIG. 2C) is selected for the first iteration of the noise reduction routine, and its corresponding target pixel value TV is determined to be 106. Since this is the first iteration of the noise reduction routine, the target pixel value TV corresponds to the original pixel value OV1 as discussed in reference to FIG. 3 above. More specifically, it can be seen from FIG. 2A that the pixel at position P1 has an original pixel value OV1 of 106. This value is copied to the pixel at the corresponding position P1 in the modified pixel array illustrated in FIG. 2C. Thus, the target pixel value TV for the pixel at position P1 in the modified pixel array is 106 for the first iteration of the noise reduction routine.

Referring to FIG. 5, a pixel adjacent to the pixel at position P1 is selected at step 502, and its corresponding adjacent pixel value AV is determined. In this exemplary embodiment of the present invention, the noise reduction routine proceeds in a direction from left to right of the modified pixel array (FIG. 2C) as illustrated by arrow A in FIG. 2C. Thus, referring to FIG. 2C, the pixels adjacent to the pixel at position P1 are the pixels at positions P2 and P3. For exemplary purposes, the pixel at position P2 is selected for the first iteration of the noise reduction routine and the pixel at position P3 will be the adjacent pixel for the second iteration. From FIG. 2A, it can be seen that the adjacent pixel at position P2 has an original pixel value OV2 of 100 which has been copied to the pixel at the corresponding position P2 in the modified pixel array illustrated in FIG. 2C. Thus, the adjacent pixel value AV of the adjacent pixel at position P2 in the modified pixel array is 100.

Having determined the values of the target pixel and the adjacent pixel at steps 501 and 501, respectively, at step 503 it is determined whether these two adjacent pixel values are equal. In this example, since the target pixel value TV is equal to 106, and the adjacent pixel value AV is equal to 100, the adjacent pixel values are determined not equal. For purposes of illustrations, however, if the adjacent pixel values were determined to be equal, the noise reduction routine would proceed to steps 504–505 whose procedures are substantially similar to steps 404–405, respectively, discussed in conjunction with FIG. 4, thus a discussion thereof is omitted herein.

Referring back to FIG. 5, at step 506, the DELTA is calculated as the absolute value of the difference between the two adjacent pixel values (TV-AV), divided by a predetermined conversion factor K. In this representative example, the conversion factor K is 10. Thus, referring again to FIG. 2C, the adjacent pixel value AV of the pixel at position P2, which is 100, is subtracted from the target pixel value TV of the pixel at position P1, which is 106, leaving 6 as the difference. Dividing 6, by the conversion factor K known to be 10, yields a DELTA of 0.6 (6/10).

After determining the value of the DELTA at step 506, it is determined at step 507 whether the target pixel value TV is greater than the adjacent pixel value AV. This step determines whether energy equivalent to the DELTA value of 0.6 will migrate from the target pixel to the adjacent pixel or vice versa. In this example, the target pixel value TV of 106, is greater than the adjacent pixel value AV2 of 100. Thus, the routine proceeds to step 508, where a first modified pixel value MV1 is determined by subtracting the DELTA value of 0.6 from the target pixel value TV of 106, yielding the first modified pixel value MV1 of 105.4.

Then, at step 509, it is determined whether the first modified pixel value MV1 of 105.4 is greater than or equal to the lower limit. In this embodiment, the lower limit is equal to the original pixel value OV1 of the target pixel less the corresponding noise estimate value NV1. The original pixel value OV1 of the target pixel at position P1 is 106 as seen in FIG. 2A and the corresponding noise estimate value NV1 is 17 as seen in the corresponding noise estimate array in FIG. 2B. Thus, the first modified pixel value MV1 must be greater than or equal to 89 (106 minus 17). In this example, the first modified pixel value MV1 of 105.4 exceeds this lower limit. Thus, the routine proceeds to step 511.

However, if at step 509 it is determined that the first modified pixel value MV1 is below the lower limit of 89, the DELTA determined at step 506 is recalculated to obtain a first modified DELTA. For example, if in the example discussed, the first modified pixel value MV1 obtained at step 508 were 85 (i.e., less than 89), then the first modified DELTA would be calculated. In this exemplary embodiment the first modified DELTA is equal to the difference between the first modified pixel value MV1 obtained at step 508 and the lower limit (i.e., the original pixel value of the target pixel less its corresponding noise estimate value). Thus, the first modified DELTA is equal to the difference between 85 (the first modified pixel value MV1) and 89 (the lower limit), which is 4.

Referring back to FIG. 5 and the prior example, at step 511 a second modified pixel value MV2 is determined by adding DELTA to the adjacent pixel value AV. In the example, since the first modified pixel value MV1 of 105.4 is greater than the lower limit of 89, the DELTA value of 0.6 calculated at step 506 is added to the adjacent pixel value AV of 100, yielding a value of 100.6 for the second modified pixel value MV2. However, for purposes of illustration, if the first modified pixel value MV 1 is less than the lower limit of 89, the DELTA recalculated at step 510 is used to obtain the second modified pixel value MV2.

At step 512, it is determined whether the second modified pixel value MV2 determined at step 511 is less than or equal to an upper limit. In this embodiment, the upper limit is equal to the sum of the original pixel value OV2 of the adjacent pixel at position P2 and the corresponding noise estimate value NV2. The original pixel value OV2 is 100 as seen in FIG. 2A and the corresponding noise estimate value NV2 is 25 as seen in the corresponding noise estimate array in FIG. 2B. Thus, the second modified pixel value MV2 must be less than or equal to 125 (100 plus 25). In this example, the second modified pixel value MV2 of 100.6 does not exceed this upper limit. Thus, the routine proceeds to step 514.

However, if at step 512 it is determined that the second modified pixel value MV2 is above the upper limit of 125, the DELTA is recalculated again to obtain a second modified DELTA. For example, for purposes of illustration, if in the example discussed, the second modified pixel value MV2 obtained at step 511 is a value greater than the upper limit of 125 (e.g., 127), then the second modified DELTA is calculated. In this exemplary embodiment, the second modified DELTA is equal to the difference between the second modified pixel value MV2 obtained at step 511 and the upper limit (i.e., the sum of the original pixel value of the adjacent pixel and the corresponding noise estimate value). Thus, the second modified DELTA would be equal to the difference between 127 (the second modified pixel value MV2) and 125 (the upper limit), which is 2.

At step 514 the first modified pixel value MV1 is recalculated by subtracting the DELTA from the target pixel value TV. In this example, since the first modified pixel value MV1 is above the lower limit and the second modified pixel value MV2 is below the upper limit, DELTA was not recalculated. Thus, in this example, the first modified pixel value MV1 is equal to 106 (the target pixel value TV) less 0.6 (DELTA), or 105.4. At step 515, the second modified pixel value MV2 is recalculated by adding DELTA to the adjacent pixel value AV. The same DELTA used in step 514 is used in step 515. Thus, in this example, the second modified pixel value MV2 is equal to 100 (the adjacent pixel value AV) plus 0.6 (DELTA), or 100.6. Thereafter at step 516, the first modified pixel value MV1 and the second modified pixel value MV2 are stored in the target and adjacent pixels, respectively. The noise reduction routine then proceeds to steps 525–526 which, as can be seen from the Figure, are substantially similar to steps 504–505, respectively, (as well as to steps 415–416, respectively, of FIG. 4), thus a discussion of these steps is omitted herein.

Referring back to step 507 of FIG. 5, if it is determined that the adjacent pixel value is greater than the target pixel value, then the noise reduction routine proceeds to steps 517–524. It can be seen from the Figure that step 517–524 substantially correspond to steps 508–515, respectively, with some differences. Specifically, in this case, the adjacent pixel value is determined to be the higher value, rather than the target value as is the case for the routines shown in steps 508–515. Thus, energy migrates from the adjacent pixel at position P2 to the lower valued target pixel at position P1 (as opposed to from the target pixel to the adjacent pixel as is the case for the shown in steps 508–515). Thus, the lower limit of the amount of energy that may be taken away from the higher valued adjacent pixel is based on the original pixel value OV2 of the adjacent pixel at position P2 and its corresponding noise estimate value NV2. Additionally, the upper limit of the amount of energy that may be added to the lower valued target pixel is based on the original pixel value OV1 of the target pixel at position P1 and it corresponding noise estimate value NV1. Therefore, the first and second modified pixel values MV1 and MV2, are determined based on adjacent and target pixel values, respectively.

As discussed above, the noise reduction process of the present invention may also apply to audio signals. In such case, the noise reduction routine illustrated in conjunction with FIGS. 4–5 is applied to a one dimensional data array, rather than to a two-dimensional array as is the case for image data (and shown, for example, in FIGS. 2A–2C). This will be explained more fully in conjunction with FIGS. 6A–6C below.

Figure 6B:
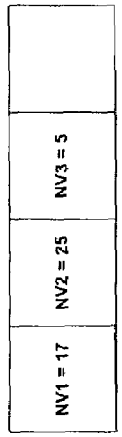
FIGS. 6A–6C illustrate a series of arrays used in the noise reduction process in accordance with another embodiment of the present invention.
Figure 6A:
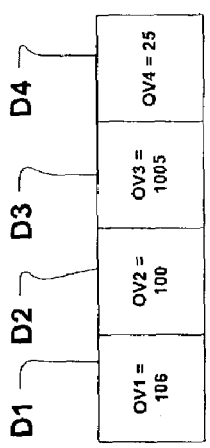
Figure 6C:
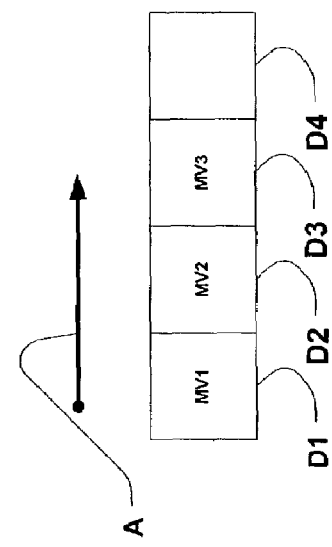

FIGS. 6A–6C illustrate a series of arrays used in the noise reduction process in accordance with another embodiment of the present invention. As can be seen, FIGS. 6A–6C are similar to FIGS. 2A–2C, respectively. Specifically, FIG. 6A illustrates an original audio signal array comprising a plurality of data cells for a portion of audio data captured by the signal detector (FIG. 1). Just as each pixel in the original pixel array illustrated in FIG. 2A has a corresponding original value OVx, each data cell in the original audio signal array illustrated in FIG. 6A has a corresponding original data value OVx. For example, the data cell at position D1 has an original data value OV1 of 106.

FIG. 6B illustrates a noise estimate array of noise estimate values. Just as each noise estimate value in the noise estimate array illustrated in FIG. 2B corresponds to a respective original pixel value of the pixel array shown in FIG. 2A, each noise estimate value in the noise estimate array illustrated in FIG. 6B corresponds to a respective original data value of the original audio signal array shown in FIG. 6A. For example, the original data value OV1 of 106 for the data cell at position D1 has a corresponding noise estimate value NV1 of 17. FIG. 6C illustrates a modified audio signal array of modified data values MVx obtained from the noise reduction process. Just as each pixel in the modified pixel array illustrated in FIG. 2C corresponds to a respective pixel in the original pixel array illustrated in FIG. 2A, each data cell in the modified audio signal array illustrated in FIG. 6C corresponds to a respective data cell in the original audio signal array illustrated in FIG. 6A.

For exemplary purposes, the noise reduction process illustrated in FIGS. 3–4 is discussed above in conjunction with FIGS. 2A–2C. However, the noise reduction process illustrated in FIGS. 3–4 may also be discussed in conjunction with the audio signal array, the corresponding noise estimate values and the modified data values as shown in FIGS. 6A–6C, respectively with a few modifications. First, in the case of applying the noise reduction process to audio signals, the illustration and the discussion of FIG. 4 would refer to data cell and data value, rather than pixel and pixel value as shown (and applied to image data). As noted above, the terms pixel and pixel value were used for exemplary purposes to explain the noise reduction process in conjunction with an image signal.

Second, as seen from FIGS. 6A and 6C, for audio signals, each data in the original data array and the modified data array, respectively, has at most two adjacent data. By contrast, for image data, as seen from FIGS. 2A and 2C, a pixel in the original pixel array and the modified pixel array, respectively, can have up to four adjacent pixels. Thus, the noise reduction routine of FIG. 4 has fewer iterations for each data value in the modified audio signal array than for each pixel vale in the modified pixel array. Apart from the few modifications discussed herein, the noise reduction process in accordance with the various embodiments of the present invention may be applied to both image data as well as audio data, or a combined image and audio data.

The various processes described above including the processes operating in the software application execution environment in the signal system 100 including the noise reduction section 120, performing the noise reduction processes and routines described in conjunction with FIGS. 3–5, may be embodied as computer programs developed using an object oriented language that allows the modeling of complex systems with modular objects to create abstractions that are representative of real world, physical objects and their interrelationships. The software required to carry out the inventive process, which may be stored in a memory of the signal system 100, may be developed by a person of ordinary skill in the art and may include one or more computer program products.

In this manner, in accordance with the various embodiments of the present invention, the noise reduction procedure may be applied in an iterative manner to each data value of the signal captured by the signal detector 110 (FIG. 1), until the signal noise is sufficiently reduced. Moreover, for each subsequent data cell in the modified data array, the modified value of the data cell from the previous iteration is used for determining the noise reduction level for the subsequent data cell in a given direction of the modified data array.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of reducing signal noise, comprising the steps of:

calculating a delta based on a target data value and an adjacent data value, the target and adjacent data values corresponding to a signal;

determining a first modified data value based on the delta;

modifying the delta to obtain a first modified delta if the first modified data value transcends a first predetermined value;

determining a second modified data value based on one of the delta and the first modified delta;

modifying one of the delta and the first modified delta to obtain a second modified delta, if the second modified data value transcends a second predetermined value; and recalculating the first and second modified data values based on one of the delta, the first modified delta, and the second modified delta.

2. The method of claim 1, wherein the step of calculating the delta comprises:

determining a difference value between the target data value and the adjacent data value; and dividing the difference value by a conversion factor.

3. The method of claim 2, wherein the conversion factor is a predetermined value.

4. The method of claim 1, further including the steps of:

obtaining the target data value from a target data cell in a signal array; and obtaining the adjacent data value from an adjacent data cell in the signal array.

5. The method of claim 4, wherein the adjacent data cell is positioned adjacent to the target data cell in the signal array.

6. The method of claim 1, wherein the step of determining the first modified data value comprises:
comparing the target data value and the adjacent data value to determine a higher data value; and
subtracting the delta from the higher data value.

7. The method of claim 1, wherein the first predetermined value is determined based on an original data value of one of the target data cell and the adjacent data cell and a noise estimate value corresponding to the original data value.

8. The method of claim 1, wherein the step of modifying the delta to obtain a first modified delta comprises:
determining whether the first modified data value is greater than or equal to the first predetermined value; and
calculating the first modified delta based on a difference between the first predetermined value and the first modified data value, if the first modified data value is determined to be less than the first predetermined value.

9. The method of claim 8, wherein the first predetermined value is substantially equal to a difference between an original data value of one of the target data cell and the adjacent data cell and a noise estimate value corresponding to the original data value.

10. The method of claim 8, wherein the original data value of one of the target data cell and the adjacent data cell is the original data value of one of the target data cell and the adjacent data cell having a higher data value.

11. The method of claim 8, wherein each of the target data cell and the adjacent data cell has a corresponding noise estimate value.

12. The method of claim 8, further comprising the step of:
maintaining the delta determined at the step of calculating the delta if the first modified data value is determined to be greater than or equal to the first predetermined value.

13. The method of claim 1, wherein the step of determining the second modified data value comprises:
comparing the target data value and the adjacent data value to determine a lower data value; and
adding the first modified delta to the lower data value to obtain the second modified data value if the first modified data value is determined to be less than the first predetermined value, and alternatively, adding the delta to the lower data value to obtain the second modified data value if the first modified data value is determined to be greater than or equal to the first predetermined value.

14. The method of claim 1, wherein the second predetermined value is determined based on an original data value of one of the target data cell and the adjacent data cell and a noise estimate value corresponding to the original data value.

15. The method of claim 1, wherein the step of modifying one of the delta and the first modified delta to obtain a second modified delta comprises:
determining whether the second modified data value is less than or equal to the second predetermined value; and
calculating the second modified delta based on a difference between the second predetermined value and the second modified data value, if the second modified data value is determined to be greater than the second predetermined value.

16. The method of claim 15, wherein the second predetermined value is substantially equal to a sum of an original data value of one of the target data cell and the adjacent data cell and a noise estimate value corresponding to the original data value.

17. The method of claim 15, wherein the original data value of one of the target data cell and the adjacent data cell is the original data value of one of the target data cell and the adjacent data cell having a lower data value.

18. The method of claim 15, wherein each of the target data cell and the adjacent data cell has a corresponding noise estimate value.

19. The method of claim 15, further comprising the steps of:
maintaining the delta determined at the step of calculating the delta, if the first modified data value is determined to be greater than or equal to the first predetermined value, and the second modified data value is determined to be less than or equal to the second predetermined value, and alternatively,
maintaining the first modified delta determined at the step of modifying the delta, if the first modified data value is determined to be less than the first predetermined value, and the second modified data value is determined to be less than or equal to the second predetermined value.

20. The method of claim 1, wherein the step of recalculating comprises:
subtracting from the first modified data value and adding to the second modified data value, one of the delta, the first modified delta, and the second modified delta.

21. The method of claim 20, wherein:
the delta is subtracted from the first modified data value and added to the second modified data value when the first modified data value is determined to be greater than or equal to the first predetermined value, and the second modified data value is determined to be less than or equal to the second predetermined value,
the first modified delta is subtracted from the first modified data value and added to the second modified data value when the first modified data value is determined to be less than the first predetermined value, and the second modified data value is determined to be less than or equal to the second predetermined value, and
the second modified delta is subtracted from the first modified data value and added to the second modified data value when the second modified data value is determined to be greater than the second predetermined value.

22. The method of claim 21,
wherein the first predetermined value is substantially equal to a difference between a first original data value of one of the target data cell and the adjacent data cell and a first noise estimate value corresponding to the first original data value, and
wherein the second predetermined value is based on a sum of a second original data value of one of the target data cell and the adjacent data cell and a second noise estimate value corresponding to the second original data value.

23. The method of claim 22,
wherein the first original data value of one of the target data cell and the adjacent data cell is an original data value of one of the target data cell and the adjacent data cell having a higher data value, and wherein the second original data value of one of the target data cell and the adjacent data cell is an original data value of one of the target data cell and the adjacent data cell having a lower data value.

24. The method of claim 22, wherein each of the target data value and the adjacent data value has a corresponding noise estimate value.

25. The method of claim 1, wherein the target data value corresponds to a target pixel value and the adjacent data value corresponds to an adjacent pixel value.

26. The method of claim 1, wherein the delta, the modified delta, and the second modified delta each correspond to an amount of energy in the signal.

27. The method of claim 1, wherein the delta, the first modified delta, and the second modified delta each correspond to an amount of energy that can be removed from one of the target data value and the adjacent data value having a higher value, and added to the other of the adjacent data value and the target data value having a lower value.

28. An apparatus for reducing signal noise, comprising:
a noise reduction section configured to receive a signal, the noise reduction section further configured to:
calculate a delta based on a target data value and an adjacent data value, the target and adjacent data values corresponding to the signal;
determine a first modified data value based on the delta;
modify the delta to obtain a first modified delta, if the first modified data value transcends a first predetermined value;
determine a second modified data value based on one of the delta and the first modified delta;
modify one of the delta and the first modified delta to obtain a second modified delta, if the second modified data value transcends a second predetermined value; and
recalculate the first and second modified data values based on one of the delta, the first modified delta, and the second modified delta.

29. The apparatus of claim 28, wherein the noise reduction section configured to calculate the delta is further configured to:
determine a difference value between the target data value and the adjacent data value; and
divide the difference value by a conversion factor.

30. The apparatus of claim 29, wherein the conversion factor is a predetermined value.

31. The apparatus of claim 28, wherein the noise reduction section is further configured to:
obtain the target data value from a target data cell in a signal array; and
obtain the adjacent data value from an adjacent data cell in the signal array.

32. The apparatus of claim 31, wherein the adjacent data cell is positioned adjacent to the target data cell in the signal array.

33. The apparatus of claim 28, wherein the noise reduction section configured to determine the first modified data value is further configured to:
compare the target data value and the adjacent data value to determine a higher data value; and
subtract the delta from the higher data value.

34. The apparatus of claim 28, wherein the first predetermined value is determined based on an original data value of one of the target data cell and the adjacent data cell and a noise estimate value corresponding to the original data value.

35. The apparatus of claim 28, wherein the noise reduction section configured to modify the delta to obtain a first modified delta is further configured to:
determine whether the first modified data value is greater than or equal to the first predetermined value; and
calculate the first modified delta based on a difference between the first predetermined value and the first modified data value, if the first modified data value is determined to be less than the first predetermined value.

36. The apparatus of claim 35, wherein the first predetermined value is substantially equal to a difference between an original data value of one of the target data cell and the adjacent data cell and a noise estimate value corresponding to the original data value.

37. The apparatus of claim 35, wherein the original data value of one of the target data cell and the adjacent data cell is the original data value of one of the target data cell and the adjacent data cell having a higher data value.

38. The apparatus of claim 35, wherein each of the target data cell and the adjacent data cell has a corresponding noise estimate value.

39. The apparatus of claim 35, wherein the noise reduction section is further configured to maintain the delta determined at the step of calculating the delta if the first modified data value is determined to be greater than or equal to the first predetermined value.

40. The apparatus of claim 28, wherein the noise reduction section configured to determine the second modified data value is further configured to:
compare the target data value and the adjacent data value to determine a lower data value; and
add the first modified delta to the lower data value to obtain the second modified data value if the first modified data value is determined to be less than the first predetermined value, and alternatively, adding the delta to the lower data value to obtain the second modified data value if the first modified data value is determined to be greater than or equal to the first predetermined value.

41. The apparatus of claim 28, wherein the second predetermined value is determined based on an original data value of one of the target data cell and the adjacent data cell and a noise estimate value corresponding to the original data value.

42. The apparatus of claim 28, wherein the noise reduction section configured to modify one of the delta and the first modified delta to obtain a second modified delta, is further configured to:
determine whether the second modified data value is less than or equal to the second predetermined value; and
calculate the second modified delta based on a difference between the second predetermined value and the second modified data value, if the second modified data value is determined to be greater than the second predetermined value.

43. The apparatus of claim 42, wherein the second predetermined value is substantially equal to a sum of an original data value of one of the target data cell and the adjacent data cell and a noise estimate value corresponding to the original data value.

44. The apparatus of claim 42, wherein the original data value of one of the target data cell and the adjacent data cell is the original data value of one of the target data cell and the adjacent data cell having a lower data value.

45. The apparatus of claim 42, wherein each of the target data cell and the adjacent data cell has a corresponding noise estimate value.

46. The apparatus of claim 42, wherein the noise reduction section is further configured to:
  maintain the delta determined at the step of calculating the delta, if the first modified data value is determined to be greater than or equal to the first predetermined value, and the second modified data value is determined to be less than or equal to the second predetermined value, and alternatively,
  maintain the first modified delta determined at the step of modifying the delta, if the first modified data value is determined to be less than the first predetermined value, and the second modified data value is determined to be less than or equal to the second predetermined value.

47. The apparatus of claim 28, wherein the noise reduction section configured to recalculate is further configured to subtract from the first modified data value and adding to the second modified data value, one of the delta, the first modified delta, and the second modified delta.

48. The apparatus of claim 47, wherein:
  the delta is subtracted from the first modified data value and added to the second modified data value when the first modified data value is determined to be greater than or equal to the first predetermined value, and the second modified data value is determined to be less than or equal to the second predetermined value,
  the first modified delta is subtracted from the first modified data value and added to the second modified data value when the first modified data value is determined to be less than the first predetermined value, and the second modified data value is determined to be less than or equal to the second predetermined value, and
  the second modified delta is subtracted from the first modified data value and added to the second modified data value when the second modified data value is determined to be greater than the second predetermined value.

49. The apparatus of claim 48,
  wherein the first predetermined value is substantially equal to a difference between a first original data value of one of the target data cell and the adjacent data cell and a first noise estimate value corresponding to the first original data value, and
  wherein the second predetermined value is based on a sum of a second original data value of one of the target data cell and the adjacent data cell and a second noise estimate value corresponding to the second original data value.

50. The apparatus of claim 49,
  wherein the first original data value of one of the target data cell and the adjacent data cell is an original data value of one of the target data cell and the adjacent data cell having a higher data value, and
  wherein the second original data value of one of the target data cell and the adjacent data cell is an original data value of one of the target data cell and the adjacent data cell having a lower data value.

51. The apparatus of claim 49, wherein each of the target data value and the adjacent data value has a corresponding noise estimate value.

52. The apparatus of claim 28, wherein the target data value corresponds to a target pixel value and the adjacent data value corresponds to an adjacent pixel value.

53. The apparatus of claim 28, wherein the delta, the modified delta, and the second modified delta each correspond to an amount of energy in the signal.

54. The apparatus of claim 28, wherein the delta, the first modified delta, and the second modified delta each correspond to an amount of energy that can be removed from one of the target data value and the adjacent data value having a higher value, and added to the other of the adjacent data value and the target data value having a lower value.

55. A program storage device readable by a machine, tangibly embodying a program of instructions executable by the machine to perform a method of reducing signal noise, the method comprising the steps of:
  calculating a delta based on a target data value and an adjacent data value, the target and adjacent data values corresponding to a signal;
  determining a first modified data value based on the delta;
  modifying the delta to obtain a first modified delta if the first modified data value transcends a first predetermined value;
  determining a second modified data value based on one of the delta and the first modified delta;
  modifying one of the delta and the first modified delta to obtain a second modified delta, if the second modified data value transcends a second predetermined value; and
  recalculating the first and second modified data values based on one of the delta, the first modified delta, and the second modified delta.

* * * * *

UNITED STATES PATENT AND TRADEMARK OFFICE
CERTIFICATE OF CORRECTION

PATENT NO. : 7,130,477 B1 Page 1 of 1
APPLICATION NO. : 10/338176
DATED : October 31, 2006
INVENTOR(S) : Benoit Schillings It is certified that error appears in the above-identified patent and that said Letters Patent is hereby corrected as shown below:

Title page, item [73] Assignee: change "Openware Systems, Inc." to --Openwave Systems Inc.--

Signed and Sealed this

Twentieth Day of March, 2007

JON W. DUDAS
*Director of the United States Patent and Trademark Office*